United States Patent
Park et al.

(10) Patent No.: US 9,990,097 B2
(45) Date of Patent: Jun. 5, 2018

(54) TOUCH SCREEN PANEL INCLUDING MULTILAYER CONNECTION WIRE AND METHOD OF MANUFACTURING THE SAME

(71) Applicant: Samsung Display Co., Ltd., Yongin-si (KR)

(72) Inventors: Sung Kyun Park, Yongin-si (KR); Jae Neung Kim, Yongin-si (KR); Ki Hyun Cho, Yongin-si (KR); Sun Haeng Cho, Yongin-si (KR); Cheol Kyu Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 92 days.

(21) Appl. No.: 15/072,624

(22) Filed: Mar. 17, 2016

(65) Prior Publication Data

US 2016/0306470 A1   Oct. 20, 2016

(30) Foreign Application Priority Data

Apr. 15, 2015   (KR) .................. 10-2015-0053225

(51) Int. Cl.
  *G06F 3/041*   (2006.01)
  *G06F 3/044*   (2006.01)

(52) U.S. Cl.
  CPC .... *G06F 3/044* (2013.01); *G06F 2203/04103* (2013.01)

(58) Field of Classification Search
  CPC ........................................ G06F 3/044
  USPC ........................................ 345/173
  See application file for complete search history.

(56) References Cited

U.S. PATENT DOCUMENTS

| 7,534,732 B1 | 5/2009 | Ngo et al. | |
| 2014/0247226 A1* | 9/2014 | Chiu | G06F 3/041 345/173 |
| 2014/0253830 A1* | 9/2014 | Li | G06F 1/1637 349/12 |
| 2015/0220183 A1* | 8/2015 | Youngs | G06F 3/044 345/173 |
| 2015/0362960 A1* | 12/2015 | Chang | G06F 3/044 345/173 |
| 2017/0147116 A1* | 5/2017 | Lee | G06F 3/0412 |

FOREIGN PATENT DOCUMENTS

| KR | 10-2007-0013816 | 1/2007 |
| KR | 10-2011-0060721 | 6/2011 |
| KR | 10-2012-0133474 | 12/2012 |

* cited by examiner

*Primary Examiner* — Long D Pham
(74) *Attorney, Agent, or Firm* — H.C. Park & Associates, PLC

(57) ABSTRACT

A touch screen panel includes a substrate, a sensing electrode, a connection wire, and a passivation layer. The substrate includes a first area and a second area disposed outside the first area. The sensing electrode is disposed in the first area. The connection wire is electrically connected to the sensing electrode, the connection wire being disposed in the second area. The passivation layer covers portions of the sensing electrode and the connection wire. The sensing electrode includes a first conductive layer disposed on the substrate. The connection wire includes a second conductive layer disposed on the substrate, a metal wiring layer disposed on the second conductive layer, and a capping layer disposed on the second conductive layer.

20 Claims, 5 Drawing Sheets

TOUCH SCREEN PANEL INCLUDING MULTILAYER CONNECTION WIRE AND METHOD OF MANUFACTURING THE SAME

CROSS-REFERENCE TO RELATED APPLICATION

This application claims priority from and the benefit of Korean Patent Application No. 10-2015-0053225, filed on Apr. 15, 2015, which is incorporated by reference for all purposes as if fully set forth herein.

BACKGROUND

Field

Exemplary embodiments relate to a touch screen panel and a method of manufacturing the same. More particularly, exemplary embodiments relate to a touch screen panel with improved wiring reliability, and a method of manufacturing the same.

Discussion

A touch screen panel is an input device allowing content displayed via a screen of a display device, or the like, to be selected (or otherwise interacted with) using an input device, such as a finger or hand of a user or an object, e.g., a stylus, etc. In this manner, the user may issue commands via touch or near touch interactions. To this end, such touch screen panels may be utilized to replace other input devices typically connected to a display device, such as a keyboard, a mouse, a trackpad, etc.

Conventional touch screen panels may be categorized based on touch detection schemes, such as, for example, a resistive scheme, a photo-sensing scheme, and a capacitive scheme. The capacitive scheme may be further classified into a self-capacitance scheme and a mutual capacitance scheme. The self-capacitance scheme may facilitate hovering (or near-touch) interactions, as well as multi-touch interactions. A typical self-capacitance type touch screen panel may include a plurality of conductive sensing electrodes spaced apart from one another and formed on a first surface of a substrate. In this manner, each of the plurality of conductive sensing electrodes may correspond to unique position information. Accordingly, when a user's hand or other touch object comes into contact (or near-contact) with the self-capacitance type touch screen panel, a change in capacitance associated with the conductive sensing electrodes may be detected, which may be further utilized to determine a position of interaction. In addition, conventional self-capacitance type touch screen panels may include a plurality of electrode wirings respectively connected to the plurality of conductive sensing electrodes. The plurality of electrode wirings may be arranged between adjacent conductive sensing electrodes.

Typically, the conductive sensing electrodes are formed by applying a hybrid film of a conductive material (e.g., a silver nanowire (AgNW) material) or a conductive transparent oxide (e.g., indium tin oxide (ITO)). To this end, a pad part and a wiring part, such as fan-out part, of the electrode wirings may include copper (Cu) at least because of its selectivity with AgNW and ITO and other processing characteristics. After metal wirings and bridges are formed with a metal, such as copper (Cu), a passivation layer is typically formed on the metal wirings and/or bridges to prevent (or at least reduce) corrosion. For instance, the pad part and the fan-out part may include an inorganic passivation film (e.g., $Si_xN_y$) for passivation. Further, zinc indium oxide (ZIO) may be applied as a capping layer of the pad part.

It is noted, however, that the inorganic passivation layer and the capping layer are usually deposited at relatively low temperatures when plastic substrates are utilized with the touch screen panels. As such, the inorganic passivation layer and the capping layer may not be suitable in relatively high temperature conditions. Also, corrosion of the Cu in the pad part and the fan-out part may still occur. Moreover, because ZIO and $Si_xN_y$ have increasing moisture permeability as tissue density is lowered with lower deposition temperatures, the thickness of the capping layer and the passivation layer may be increased to improve their protective features. It is noted, however, that increasing thickness may increase stress, which may cause, at least in part, cracks to form in a lower substrate or hamper bending characteristics of such touch screen panels. Therefore, there is a need for an approach that provides efficient, cost effective techniques to improve the protection and passivation structures in touch screen panels.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a touch screen panel with improved wiring reliability.

Exemplary embodiments provide a method of manufacturing a touch screen panel with improved wiring reliability.

Additional aspects will be set forth in the detailed description which follows, and, in part, will be apparent from the disclosure, or may be learned by practice of the inventive concept.

According to one or more exemplary embodiments, a touch screen panel includes a substrate, a sensing electrode, a connection wire, and a passivation layer. The substrate includes a first area and a second area disposed outside the first area. The sensing electrode is disposed in the first area. The connection wire is electrically connected to the sensing electrode, the connection wire being disposed in the second area. The passivation layer covers portions of the sensing electrode and the connection wire. The sensing electrode includes a first conductive layer disposed on the substrate. The connection wire includes a second conductive layer disposed on the substrate, a metal wiring layer disposed on the second conductive layer, and a capping layer disposed on the second conductive layer.

According to one or more exemplary embodiments, a method of manufacturing a touch screen panel includes: forming a conductive layer on a substrate, the substrate including a first area and a second area disposed outside the first area; patterning the conductive layer to form a sensing electrode in the first area and a connection wire in the second area; depositing a first metal layer on the connection wire; depositing a second metal layer on the connection wire; patterning, simultaneously, the first metal layer and the second metal layer to form a metal wiring layer and a capping layer; and forming a passivation layer on the substrate. The first area is associated with touch interaction detection.

According to one or more exemplary embodiments, the touch screen panel may increase the reliability of metal wirings in a relatively high temperature and/or relatively high humidity environment, including during manufacturing conditions. To this end, the reliability of the metal wirings may be improved, without affecting a patterning layout, via the application of the capping layer and the passivation layer. Further, due to a difference in etching rates between the metal wiring layer and the capping layer, a T-shaped stacking structure may be formed to not only allow for step coverage, but also lateral passivation.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
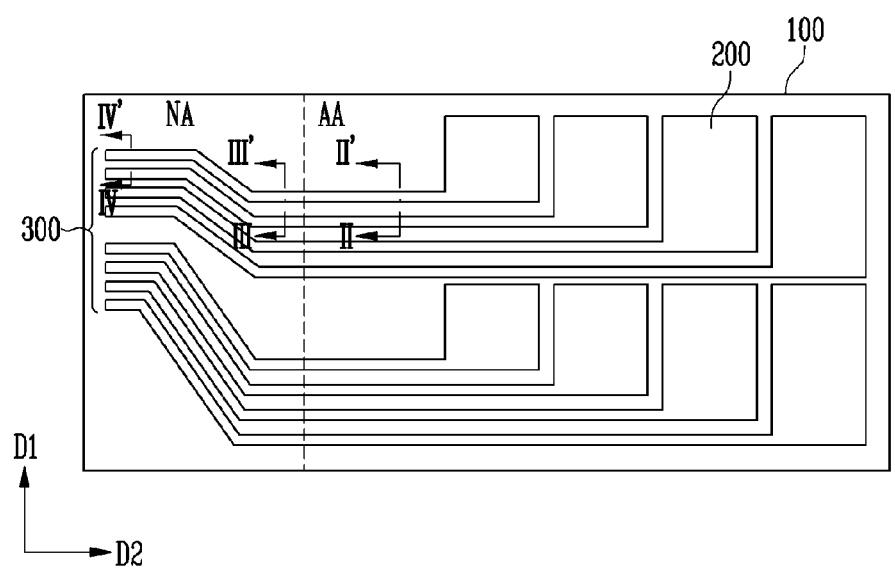
FIG. 1 is a plan view of a touch screen panel, according to one or more exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
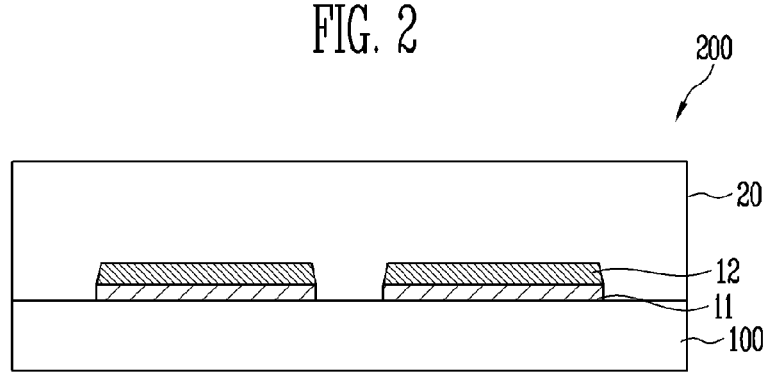
FIG. 2 is a cross-sectional view of a sensing electrode of the touch screen panel of FIG. 1 taken along sectional line II-II', according to one or more exemplary embodiments.
Figure 3:
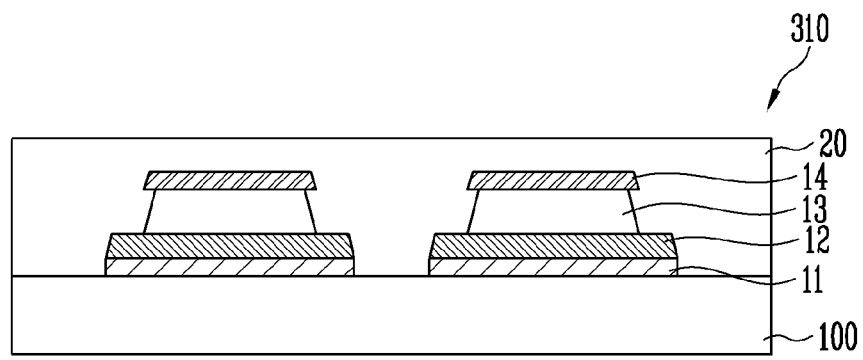
FIG. 3 is a cross-sectional view of a fan-out part of the touch screen panel of FIG. 1 taken along sectional line III-III', according to one or more exemplary embodiments.
Figure 4:
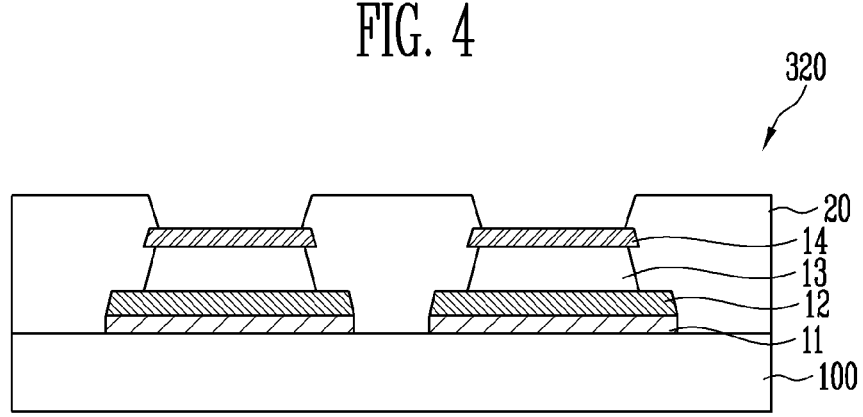
FIG. 4 is a cross-sectional view of a pad part of the touch screen panel of FIG. 1 taken along sectional line IV-IV', according to one or more exemplary embodiments.

FIG. 1 is a plan view of a touch screen panel, according to one or more exemplary embodiments. FIGS. 2, 3, and 4 are respective cross-sectional views of a sensing electrode, a fan-out part, and a pad part of the touch screen panel of FIG. 1 correspondingly taken along sectional lines II-II', III-III', IV-IV', according to one or more exemplary embodiments. FIGS. 5A, 5B, 5C, and 5D are respective views of a touch screen panel at various stages of manufacture, according to one or more exemplary embodiments.

Although various exemplary embodiments are described with respect to a touch screen panel associated with an organic light emitting display device, it is contemplated that various exemplary embodiments are also applicable to touch screen panels associated with other display devices, such as, for example, liquid crystal display devices, plasma display devices, field emission display devices, electrophoretic display devices, electrowetting display devices, and the like.

Referring to FIGS. 1-4, 5A, 5B, 5C, and 5D, a touch screen panel may include a substrate 100, a sensing electrode unit 200, and a connection wiring unit 300 electrically connected to the sensing electrode unit 200. The substrate 100 may include an active area AA and an adjacent area (e.g., a non-active area) NA disposed outside the active area AA. The connection wiring unit 300 may include a fan-out part 310 and a pad part 320.

As previously mentioned, the substrate 100 may be divided into the active area AA and the non-active area NA disposed outside the active area AA. The active area AA may be an area configured to detect touch (or near-touch) interactions and positions. It is noted that the active area AA may overlap a display area (not shown) configured to display an image in association with a display device, such as an organic light emitting display device. As such, the active area AA may overlap pixels of a display panel (not shown) disposed below the touch screen panel, e.g., below substrate 100. It is contemplated, however, that the display panel may be disposed above the touch screen panel or may include the touch screen panel. Further, the non-active area NA may be disposed outside the display area in an area that an image is either not displayed or not perceivable to an onlooker. The sensing electrode unit 200 may be positioned in the active area AA. The connection wiring unit 300 including a fan-out part 310 and a pad part 320 may be positioned in the non-active area NA.

According to one or more exemplary embodiments, the substrate 100 may be formed from any suitable material, such as, for example, one or more materials with relatively high heat resistance and relatively high chemical resistance. It is also contemplated that the substrate 100 may be a flexible substrate, e.g., configured to undergo flexing interactions (e.g., bending, twisting, folding, rolling, etc.) without failure, such as without plastic deformation. For example, the substrate 100 may be a thin film substrate formed of one or more materials selected from the group consisting of polyethyleneterephthalate (PET), polycarbonate (PC), acryl, polymethylmethacryate (PMMA), triacetylcellulose (TAC), polyethersolfone (PES), and polyimide (PI). In addition, non-tempered glass or tempered glass may also be utilized as a material of the substrate 100.

The sensing electrode unit 200 includes a plurality of conductive patterns (or sensing electrodes) for sensing a touch interaction (e.g., touch or near-touch input). The conductive patterns may be evenly distributed in the active area AA. It is contemplated, however, that any other suitable configuration of the conductive patterns may be utilized in association with exemplary embodiments described herein.

According to one or more exemplary embodiments, the touch screen panel may be a self-capacitance type touch screen panel including a structure in which the sensing electrode units 200 and connection wiring units 300 electrically connected to the sensing electrode units 200 are connected in one-to-one correspondence. The connection wiring unit 300 extends to the fan-out part 310 and the pad part 320 of the non-active area NA by way of the active area AA.

As seen in FIG. 1, the sensing electrode units 200 are formed as quadrangular patterns in a lattice structure, but exemplary embodiments are not limited thereto. For instance, the sensing electrode units 200 may be configured in any suitable manner, such as having a polygonal shape, e.g., a diamond shape, a triangular shape, a hexagonal shape, etc., a circular shape, an oval shape, or any other shape. Moreover, although the sensing electrode units 200 and the connection wiring units 300 are shown connected in one-to-one correspondence, the sensing electrode units 200 may each have a structure including first sensing electrode units arranged in a first direction, second sensing electrode units arranged in a second direction intersecting the first direction, first bridge patterns connecting adjacent ones of the first sensing electrode units, and second bridge patterns connected adjacent ones of the second sensing electrode units.

The connection wiring units 300 may be formed of the same material and on (or in) the same layer as that of the sensing electrode units 200. It is also contemplated that the connection wiring units 300 and the sensing electrode units 200 may be formed of different materials and on (or in) different layers. A line width of the connection wiring units 300 may be relatively narrow to increase line density, as well as improve other performance metrics of the touch screen panel. For instance, the line width of the connection wiring units 300 may be in a range from a few micrometers to tens of micrometers. It is contemplated, however, that any other suitable line width may be utilized in association with exemplary embodiments described herein.

Figure 5A:
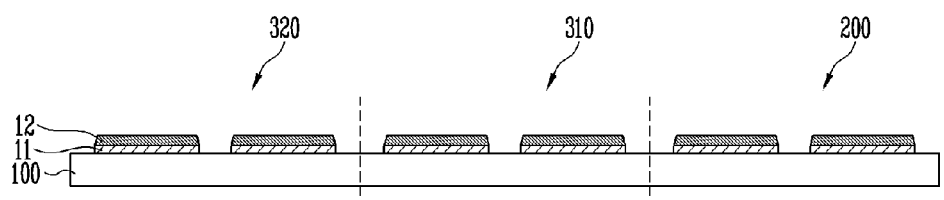
FIGS. 5A, 5B, 5C, and 5D are cross-sectional views of a touch screen panel at various stages of manufacture, according to one or more exemplary embodiments.
Figure 5B:
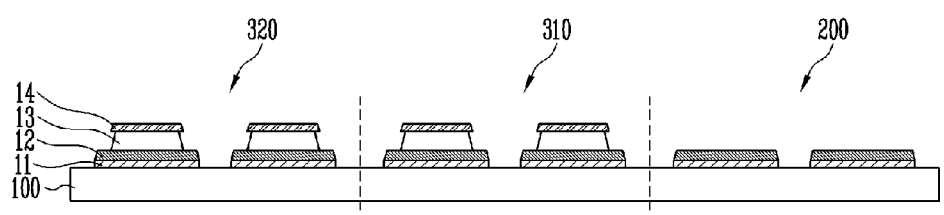

As illustrated in FIGS. 2, 5A, and 5B, a conductive layer 11 is formed on the substrate 100, and a conductive transparent oxide layer 12 is formed on the conductive layer 11 and patterned via wet etching and/or dry etching to form the sensing electrode unit 200. To this end, a passivation layer 20 may be formed on the sensing electrode unit 200. It is noted that a metal nanowire may be used in the conductive layer 11, which may be formed of silver nanowire (AgNW). It is contemplated, however, that any other suitable material may be utilized. The conductive layer 11 may be formed with any suitable shape and thickness. Further, indium tin oxide (ITO) may be used to form the conductive transparent oxide layer 12. It is contemplated, however, that any other suitable conductive transparent oxide may be utilized, such as, for example, aluminum zinc oxide (AZO), gallium zinc oxide (GZO), indium zinc oxide (IZO), etc. It is also contemplated that one or more conductive polymers (ICP) may be utilized, such as, for example, polyaniline (PANI), poly(3,4-ethylenedioxythiophene) poly(styrenesulfonate) (PEDOT:PSS), etc. As with the conductive layer 11, the conductive transparent oxide layer 12 may be formed with any suitable shape and thickness. The passivation layer 20 may be an organic passivation layer 20 formed of any suitable organic material.

With reference to FIGS. 3, 5A, 5B, and 5C, in the fan-out part 310 forming a portion of the connection wiring unit 300, a conductive layer 11 is formed on the substrate, a conductive transparent oxide layer 12 is formed on the conductive layer 11, a metal for a metal wiring layer 13 and a metal for a capping layer 14 are sequentially formed on the conductive transparent oxide layer 12 and collectively patterned via wet etching and/or dry etching. The conductive layer 11 and the conductive transparent oxide layer 12 may be the same as conductive layer 11 and conductive transparent oxide layer 12 described in association with the sensing electrode units 200. At least one of copper, aluminum, and silver, or alloys thereof may be used in the metal wiring layer 13 formed on the conductive transparent oxide layer 12. Further, one or more of titanium (Ti), molybdenum (Mo), nickel (Ni), chromium (Cr), and tungsten (W), or alloys thereof may be used in the capping layer 14 formed on the metal wiring layer 13. It is contemplated, however, that any suitable metal (or conductive polymer) may be utilized to form the metal wiring layer 13 and the capping layer 14. A thickness of the capping layer 14 may be greater than or equal to 100 Å.

According to one or more exemplary embodiments, the metal wiring layer 13 and the capping layer 14 are formed of different materials. In this manner, a T-shaped stacking structure may be generated due to a difference in etching rates of the metal wiring layer 13 and the capping layer 14, which allows for step coverage via the application of the passivation layer 20, such as an organic passivation layer, which is formed after the patterning of the metal wiring layer 13 and the capping layer 14. To this end, the stack structure in combination with the passivation layer 20 also enables lateral passivation and preventing (or otherwise reducing) lateral corrosion of the metal wiring layer 13 and the capping layer 14.

Turning to FIGS. 4, 5A, 5B, 5C, and 5C, in the pad part 320 forming a portion of the connection wiring unit 300, a conductive layer 11 is formed on the substrate 100, a conductive transparent oxide layer 12 is formed on the conductive layer 11, and a metal for a metal wiring layer 13 and a metal for a capping layer 14 are sequentially formed on the conductive transparent oxide layer 12. The metal wiring layer 13 and the capping layer 14 are collectively patterned through wet etching and/or dry etching to form a metal wiring layer 13 and a capping layer 14. It is noted that the conductive layer 11 and the conductive transparent oxide layer 12 may be the same as the conductive layer 11 and the conductive transparent oxide layer 12 described in association with the sensing electrode unit 200. To this end, the metal wiring layer 13 and the capping layer 14 may be the same as the metal wiring layer 13 and the capping layer 14 described with the fan-out part 310.

Figure 5C:
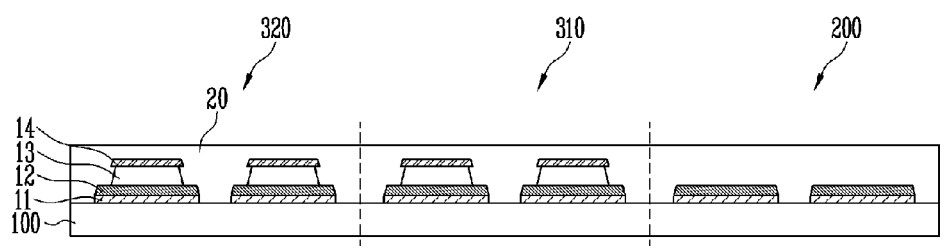

As illustrated in FIG. 5C, a passivation layer 20 is formed to cover all the layers on the substrate on which the sensing electrode unit 200, the fan-out part 310, and the pad part 320 have been formed. Like the fan-out part 310, the T-shaped stacking structure formed in the pad part 320 may be generated due to a difference in etching rates of the metal wiring layer 13 and the capping layer 14, which allows for step coverage via the application of the passivation layer 20, such as an organic passivation layer, which is formed after the patterning of the metal wiring layer 13 and the capping layer 14. To this end, the stack structure in combination with the passivation layer 20 also enables lateral passivation and preventing (or otherwise reducing) lateral corrosion of the metal wiring layer 13 and the capping layer 14.

Figure 5D:
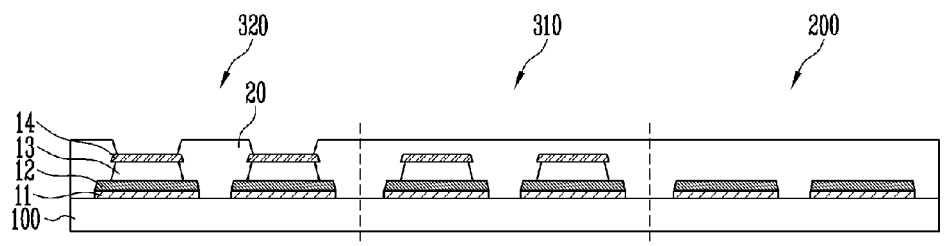

As seen in FIG. 5D, the capping layer 14 on the pad part 320 may be exposed via patterning of the passivation layer 20. For instance, the passivation layer may be photo-patterned, however, it is contemplated that any other suitable patterning technique may be utilized in association with exemplary embodiments descried herein.

Figure 6:
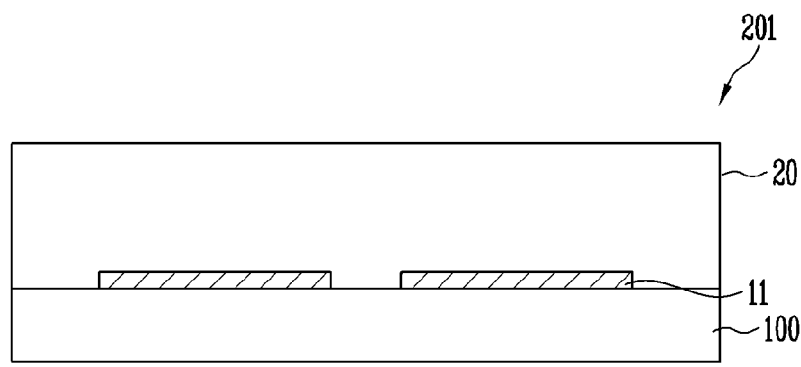
FIG. 6 is a cross-sectional view of a sensing electrode of a touch screen panel, according to one or more exemplary embodiments.
Figure 7:
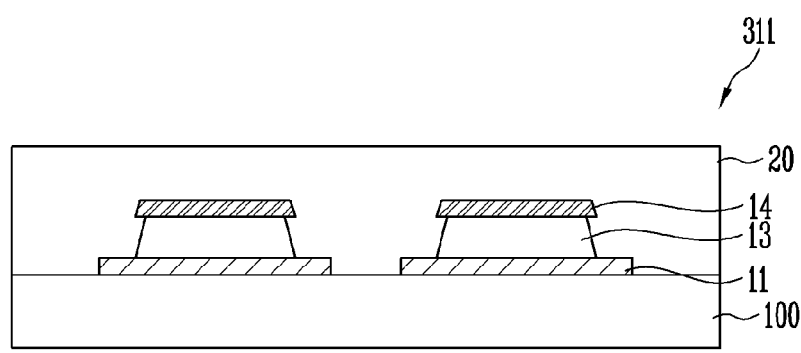
FIG. 7 is a cross-sectional view of a fan-out part of a touch screen panel, according to one or more exemplary embodiments.
Figure 8:
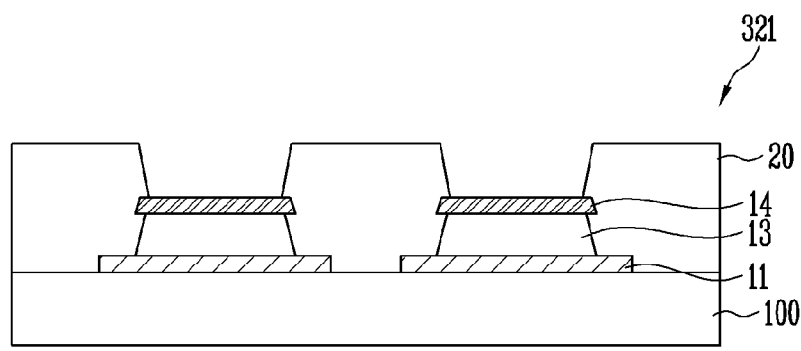
FIG. 8 is a cross-sectional view of a pad part of a touch screen panel, according to one or more exemplary embodiments.

FIGS. 6, 7, and 8 are respective cross-sectional views of a sensing electrode unit, a fan-out part, and a pad part of a touch screen panel, according to one or more exemplary embodiments. The sensing electrode unit 201, the fan-out part 311, and the pad part 321 may be similar to the sensing electrode unit 200, the fan-out part 310, and the pad part 320, and, therefore, to avoid obscuring exemplary embodiments described herein, redundant descriptions will also be avoided.

As seen in FIG. 6, the sensing electrode unit 201 may include a conductive layer 11 formed on the substrate 100. The conductive layer 11 may be patterned via wet and/or dry etching to form the sensing electrode unit 201. A passivation layer 20 is formed on the substrate 100 with the sensing electrode unit 201 formed between the passivation layer and the substrate 100. Silver nanowire (AgNW) may be used to form the conductive layer 11. In this manner, the sensing electrode unit 201 omits the transparent oxide layer 12, and, as such, may be a single layer structure versus a multilayer structure as in FIGS. 2, 5A, 5B, 5C, and 5D.

As illustrated in FIG. 7, in the fan-out part 311 forming a portion of the connection wiring unit, a conductive layer 11 is formed on the substrate 100, a metal wiring layer 13 is formed on the conductive layer 11, and a capping layer 14 is formed on the metal wiring layer 13. The metal wiring layer 13 and the capping layer 14 may be simultaneously patterned, and, thereafter, a passivation layer 20 may be formed on the substrate with the fan-out part 311 formed therebetween. In this manner, the fan-out part 311 may omit the conductive transparent oxide layer 12, as in the sensing electrode unit 201. As such, the conductive layer 11, the metal wiring layer 13, the capping layer 14, and the passivation layer 20 are otherwise the same as those described in association with FIGS. 1-4, 5A, 5B, 5C, and 5D.

As previously described, the metal wiring layer 13 and the capping layer 14 may be sequentially deposited on the conductive layer 11 and collectively patterned using wet etching and/or dry etching. This may form a T-shaped stacking structure due to a difference in etching rates of the metal wiring layer 13 and the capping layer 14. This may allow for step coverage via the application of the passivation layer 20, such as an organic passivation layer, which is formed after the patterning of the metal wiring layer 13 and the capping layer 14. To this end, the stack structure in combination with the passivation layer 20 also enables lateral passivation and preventing (or otherwise reducing) lateral corrosion of the metal wiring layer 13 and the capping layer 14.

Turning to FIG. 8, in the pad part 321 forming a portion the connection wiring unit, a conductive layer 11 is formed on the substrate 100, a metal wiring layer 13 is formed on the conductive layer 11, a capping layer 14 is formed on the metal wiring layer 13, a passivation layer 20 is formed on the substrate 100 with the pad part 321 formed therebetween. The passivation layer is patterned (e.g., photo-patterned) to expose portions of the capping layer 14. In this manner, the pad part 321 omits the conductive transparent oxide layer 12 described in association with FIGS. 4, 5A, 5B, 5C, and 5D. The conductive layer 11, the metal wiring layer 13, the capping layer 14, and the passivation layer 20 are otherwise the same as described in association with FIGS. 4, 5A, 5B, 5C, and 5D.

As previously described, the metal wiring layer 13 and the capping layer 14 may be sequentially deposited on the conductive layer 11 and collectively patterned using wet etching and/or dry etching. This may form a T-shaped stacking structure due to a difference in etching rates of the metal wiring layer 13 and the capping layer 14. This may allow for step coverage via the application of the passivation layer 20, such as an organic passivation layer, which is formed after the patterning of the metal wiring layer 13 and the capping layer 14. To this end, the stack structure in combination with the passivation layer 20 also enables lateral passivation and preventing (or otherwise reducing) lateral corrosion of the metal wiring layer 13 and the capping layer 14.

Figure 9:
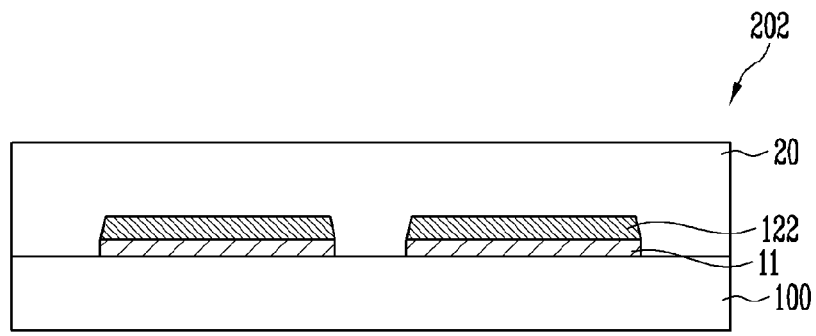
FIG. 9 is a cross-sectional view of a sensing electrode of a touch screen panel, according to one or more exemplary embodiments.
Figure 10:
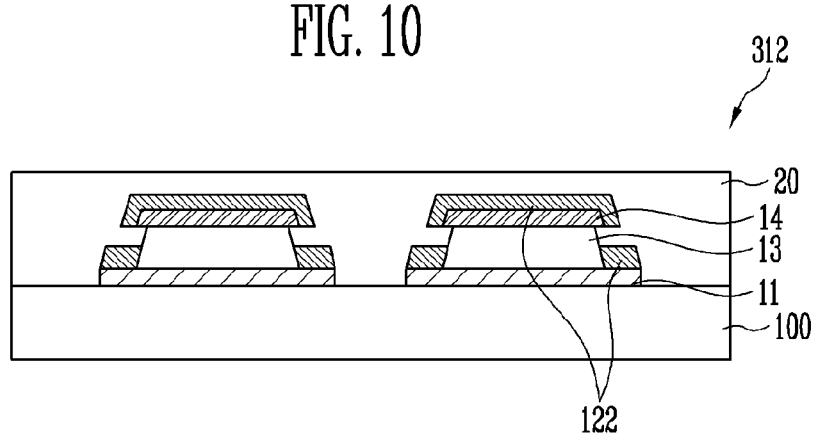
FIG. 10 is a cross-sectional view of a fan-out part of a touch screen panel, according to one or more exemplary embodiments.
Figure 11:
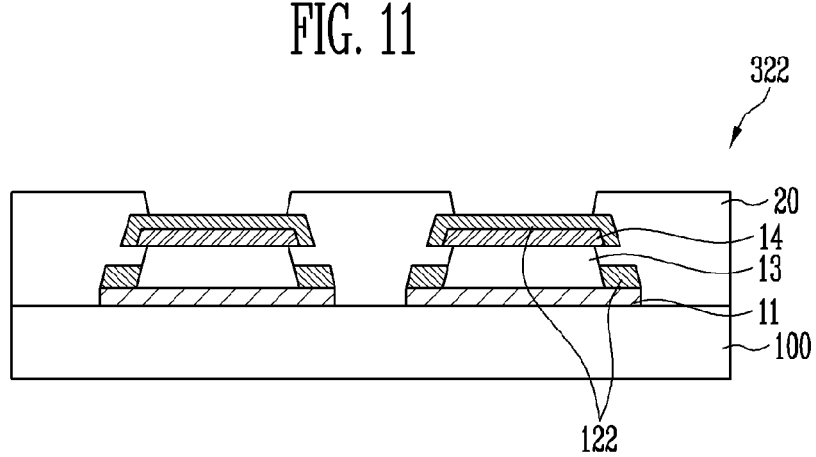
FIG. 11 is a cross-sectional view of a pad part of a touch screen panel, according to one or more exemplary embodiments.

FIGS. 9, 10, and 11 are respective cross-sectional views of a sensing electrode unit, a fan-out part, and a pad part of a touch screen panel, according to one or more exemplary embodiments. The sensing electrode unit 202, the fan-out part 312, and the pad part 322 may be similar to the sensing electrode unit 200, the fan-out part 310, and the pad part 320, and, therefore, to avoid obscuring exemplary embodiments described herein, redundant descriptions will also be avoided.

As seen in FIG. 9, the sensing electrode unit 202 may include a conductive layer 11 formed on the substrate 100 and a conductive transparent oxide layer 12 formed on the conductive layer 11. The conductive layer 11 and the conductive transparent oxide layer 12 may be patterned via wet and/or dry etching to form the sensing electrode unit 202. A passivation layer 20 may be formed on the substrate 100 with the sensing electrode unit 202 formed therebetween. As such, the conductive layer 11, the conductive transparent oxide layer 12, and the passivation layer 20 are the same as those described in association with FIGS. 2, 5A, 5B, 5C, and 5D. That is, the sensing electrode unit 202 is the same as the sensing electrode unit 200.

With reference to FIG. 10, in the fan-out part 310 forming a portion of the connection wiring unit, a conductive layer 11 is formed on the substrate 100, a metal wiring layer 13 is formed on the conductive layer 11, a capping layer 14 is formed on the metal wiring layer 13, and a conductive transparent oxide layer 12 is formed on the capping layer 14. A passivation layer 20 is then formed on the substrate 100 with the fan-out part 312 formed therebetween. The conductive layer 11, the metal wiring layer 13, the capping layer 14, and the passivation layer 20 are the same as described in association with FIGS. 3, 5A, 5B, 5C, and 5D.

Accordingly, the metal wiring layer 13 and the capping layer 14 may be sequentially deposited on the conductive layer 11 and collectively patterned using wet etching and/or dry etching. This may form a T-shaped stacking structure due to a difference in etching rates of the metal wiring layer 13 and the capping layer 14. This may allow for step coverage via the application of the passivation layer 20, such as an organic passivation layer, which is formed after the patterning of the metal wiring layer 13 and the capping layer 14. To this end, the stack structure in combination with the passivation layer 20 also enables lateral passivation and preventing (or otherwise reducing) lateral corrosion of the metal wiring layer 13 and the capping layer 14.

Differently than as described in association with FIGS. 3, 5A, 5B, 5C, and 5D, a conductive transparent oxide layer 122 is deposited on the substrate 100 with the capping layer 14 formed thereon, such that the conductive transparent oxide layer 122 is formed on an upper portion of the capping layer 14 and on end portions of the conductive layer 11. According to one or more exemplary embodiments, the thickness of the conductive transparent oxide layer 122 on the capping layer 14 may be the same as or different than the thickness of the conductive transparent oxide layer 122 on the end portions of the conductive layer 11. Moreover, although not illustrated, the conductive transparent oxide layer 122 may provide lateral sidewall coverage on exposed portions of the metal wiring layer 13.

Referring to FIG. 11, in the pad part 322 forming a portion of the connection wiring unit, a conductive layer 11 is formed on the substrate 100, a metal wiring layer 13 is formed on the conductive layer 11, a capping layer 14 is formed on the metal wiring layer 13, a conductive transparent oxide layer 122 is formed on the capping layer 14. Thereafter, a passivation layer 20 is formed on the substrate 100 with the pad part 322 formed therebetween. It is noted that the conductive layer 11, the metal wiring layer 13, and the capping layer 14 are the same as described in association with FIGS. 3, 5A, 5B, 5C, and 5D.

Accordingly, the metal wiring layer 13 and the capping layer 14 may be sequentially deposited on the conductive layer 11 and collectively patterned using wet etching and/or dry etching. This may form a T-shaped stacking structure due to a difference in etching rates of the metal wiring layer 13 and the capping layer 14. This may allow for step coverage via the application of the passivation layer 20, such as an organic passivation layer, which is formed after the patterning of the metal wiring layer 13 and the capping layer 14. To this end, the stack structure in combination with the passivation layer 20 also enables lateral passivation and preventing (or otherwise reducing) lateral corrosion of the metal wiring layer 13 and the capping layer 14.

Differently than as described in association with FIGS. 3, 5A, 5B, 5C, and 5D, a conductive transparent oxide layer 122 is deposited on the substrate 100 with the capping layer 14 formed thereon, such that the conductive transparent oxide layer 122 is formed on an upper portion of the capping layer 14 and on end portions of the conductive layer 11. According to one or more exemplary embodiments, the thickness of the conductive transparent oxide layer 122 on the capping layer 14 may be the same as or different than the thickness of the conductive transparent oxide layer 122 on the end portions of the conductive layer 11. Moreover, although not illustrated, the conductive transparent oxide layer 122 may provide lateral sidewall coverage on exposed portions of the metal wiring layer 13.

The passivation layer 20 may be patterned (e.g., photo-patterned) to expose portions of the conductive transparent oxide layer 122 that are disposed on the capping layer 14.

According to one or more exemplary embodiments, a portion of the connection wiring unit may be deposited with the same material, and, thereby, formed together with the sensing electrode unit. To this end, the portion of the connection wiring unit may be simultaneously patterned with the sensing electrode unit. For example, as described in association with FIGS. 1-4, 5A, 5B, 5C, and 5D, the conductive layer 11 and the conductive transparent oxide layer 12 may be simultaneously formed and simultaneously patterned to form the sensing electrode unit 200 and the connection wiring unit 300. As described in association with FIGS. 9-11, the conductive layer 11 may be simultaneously formed and patterned to form the sensing electrode unit and the connection wiring unit. To this end, the conductive transparent oxide layer 122 of the sensing electrode unit and the conductive transparent oxide layer 122 on the capping layer 14 of the connection wiring unit may be simultaneously formed and patterned. It is contemplated, however, that the conductive transparent oxide layers 122 of FIGS. 10 and 11 may be formed in any suitable fashion.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A touch screen panel, comprising:
   a substrate comprising a first area and a second area disposed outside the first area;
   a sensing electrode disposed in the first area;
   a connection wire electrically connected to the sensing electrode, the connection wire being disposed in the second area; and
   a passivation layer covering portions of the sensing electrode and the connection wire,
   wherein the sensing electrode comprises:
      a first conductive layer disposed on the substrate; and
      a first conductive transparent oxide layer disposed on the first conductive layer, and
   wherein the connection wire comprises:
      a second conductive layer disposed on the substrate;
      a second conductive transparent oxide layer disposed on the second conductive layer;
      a metal wiring layer disposed on the second conductive layer, the second conductive transparent oxide layer being disposed between the metal wiring layer and the substrate; and
      a capping layer disposed on the metal wiring layer.

2. The touch screen panel of claim 1, wherein:
   the metal wiring layer comprises at least one selected from the group consisting of copper, aluminum, and silver; and
   the capping layer comprises at least one selected from the group consisting of titanium, molybdenum, nickel, chromium, and tungsten.

3. The touch screen panel of claim 2, wherein the materials comprise indium tin oxide.

4. The touch screen panel of claim 1, further comprising:
   a third conductive transparent oxide layer disposed on the capping layer, the capping layer being disposed between the third conductive transparent oxide layer and the substrate.

5. The touch screen panel of claim 1, wherein the first conductive layer and the second conductive layer comprise metal nanowire.

6. The touch screen panel of claim 1, wherein the metal wiring layer and the capping layer are stacked in a T-shape configuration.

7. The touch screen panel of claim 1, wherein the passivation layer is an organic passivation layer.

8. The touch screen panel of claim 1, wherein the connection wire comprises a fan-out part and a pad part.

9. The touch screen panel of claim 1, wherein the first area corresponds to an active area configured to detect touch interactions.

10. A touch screen panel, comprising:
    a substrate comprising a first area and a second area disposed outside the first area;
    a sensing electrode disposed in the first area;
    a connection wire electrically connected to the sensing electrode, the connection wire being disposed in the second area; and
    a passivation layer covering portions of the sensing electrode and the connection wire,
    wherein the sensing electrode comprises a first conductive layer disposed on the substrate,
    wherein the connection wire comprises:
       a second conductive layer disposed on the substrate;
       a metal wiring layer disposed on the second conductive layer; and
       a capping layer disposed on the metal wiring layer, a hole in the passivation layer exposing a portion of the capping layer, and
    wherein the capping layer comprises at least one selected from the group consisting of titanium, molybdenum, nickel, chromium, and tungsten.

11. A method of manufacturing a touch screen panel, the method comprising:
    forming a conductive layer on a substrate, the substrate comprising a first area and a second area disposed outside the first area;
    patterning the conductive layer to form a sensing electrode in the first area and a connection wire in the second area;
    depositing a first metal layer on the connection wire;
    depositing a second metal layer on the connection wire;
    patterning, simultaneously, the first metal layer and the second metal layer to form a metal wiring layer and a capping layer; and
    forming a passivation layer on the substrate,
    wherein the first area is associated with touch interaction detection.

12. The method of claim 11, wherein the conductive layer comprises a conductive transparent oxide layer disposed on another conductive material layer.

13. The method of claim 11, further comprising:
    forming a conductive transparent oxide layer on the conductive layer of the sensing electrode; and
    forming a conductive transparent oxide layer on the capping layer of the connection wire.

14. The method of claim 13, wherein:
    the conductive layer comprises a metal nanowire; and
    the conductive transparent oxide comprises indium thin oxide.

15. The method of claim 11, wherein:
    the first metal layer comprises at least one selected from the group consisting of copper, aluminum, and silver; and
    the second metal layer comprises at least one selected from the group consisting of titanium, molybdenum, nickel, chromium, and tungsten.

16. The method of claim 11, wherein the metal wiring layer and the capping layer are formed in a T-shaped stack configuration.

17. The method of claim 11, wherein patterning the first metal layer and the second metal layer comprises simultaneously wet etching, dry etching, or dry etching and wet etching the first metal layer and the second metal layer.

18. The method of claim 11, further comprising:
photo-patterning the passivation layer in the second area.

19. The method of claim 11, wherein the connection wire is formed comprising a fan-out part and a pad part.

20. The method of claim 11, wherein the passivation layer covers an entire surface of the substrate.

* * * * *